United States Patent [19]

Zinn

[11] E Re. 28,976

[45] Reissued Sept. 28, 1976

[54] METHOD OF MAKING WALLS

[76] Inventor: Daniel L. Zinn, 2545 Beaufait, Detroit, Mich. 48207

[22] Filed: Nov. 20, 1975

[21] Appl. No.: 633,747

Related U.S. Patent Documents

Reissue of:

[64] Patent No.: 3,841,051
Issued: Oct. 15, 1974
Appl. No.: 382,605
Filed: July 25, 1973

U.S. Applications:

[60] Continuation of Ser. No. 257,943, May 30, 1972, abandoned, which is a division of Ser. No. 74,022, Sept. 21, 1970, abandoned.

[52] U.S. Cl. ..... 52/747; 52/243; 52/346; 52/481; 52/720; 52/732

[51] Int. Cl.[2] ..... E04B 1/74; E04C 3/07

[58] Field of Search ..... 52/243, 346, 347, 356, 52/359, 481, 714, 720, 241, 732, 743, 747, 730, 729, 100, 364, 738, 243, 242; 181/33 GA, 33 GC, 33 K, 33 A, 33 G

[56] References Cited

UNITED STATES PATENTS

| | | | |
|---|---|---|---|
| 1,826,114 | 10/1931 | Young | 52/615 |
| 2,968,070 | 1/1961 | Wolstead | 52/364 |
| 3,058,551 | 10/1962 | Martin | 52/481 X |
| 3,177,620 | 4/1965 | Brown et al. | 52/347 X |
| 3,271,920 | 9/1966 | Downing | 52/481 X |
| 3,324,615 | 6/1967 | Zinn | 52/346 X |
| 3,333,390 | 8/1967 | Banning | 52/732 |
| 3,525,189 | 8/1970 | Nelsson | 52/732 X |
| 3,611,653 | 10/1971 | Zinn | 52/407 X |
| R24,658 | 6/1959 | Hollister | 181/33 G |

*Primary Examiner*—Ernest R. Purser
*Assistant Examiner*—Leslie Braun
*Attorney, Agent, or Firm*—Cullen, Settle, Sloman & Cantor

[57] ABSTRACT

The method includes providing, arranging, and mounting a line or series of studs, between parallel fixed structures of building so that each stud when as formed and mounted has a more resilient flange and a less resilient flange and so that the more resilient flanges of any two adjacent studs face in opposite directions; equally the less resilient flanges of two adjacent studs also face in opposite directions.

The method further includes the step of providing, arranging and mounting wall panels in staggered, alternated relation on the studs with the edges of two adjacent panels being secured to the less resilient flange of the same stud, and the center of each panel is adjacent the more resilient flange of a stud between the first named pair of studs.

The studs may have less resilient and more resilient flanges as originally formed, and/or only one flange may be anchored to the channels to make that flange less resilient than the unanchored flange.

In the mounting of the panels, the center of each panel has a bearing at a more resilient flange.

10 Claims, 8 Drawing Figures

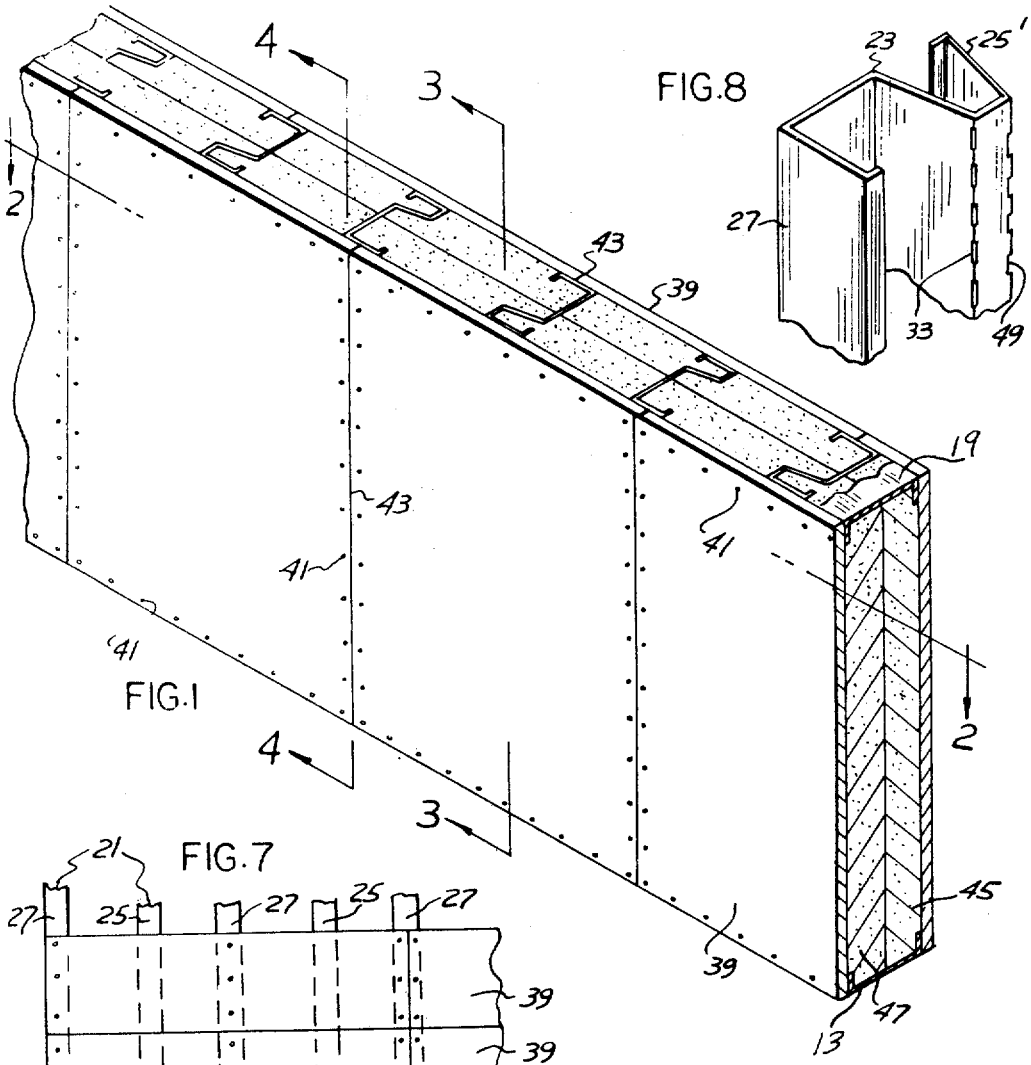
FIG.1
FIG.8
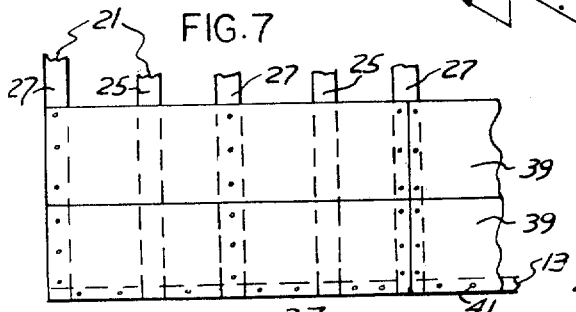
FIG.7
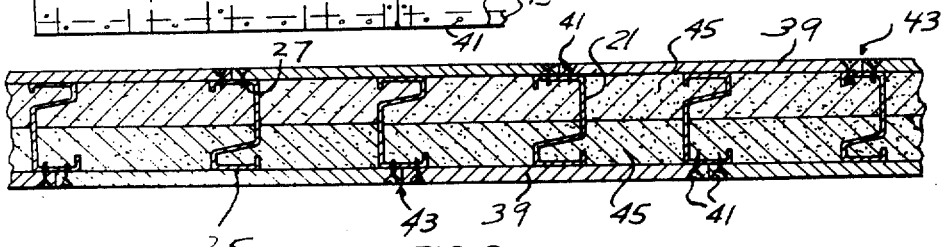
FIG.2

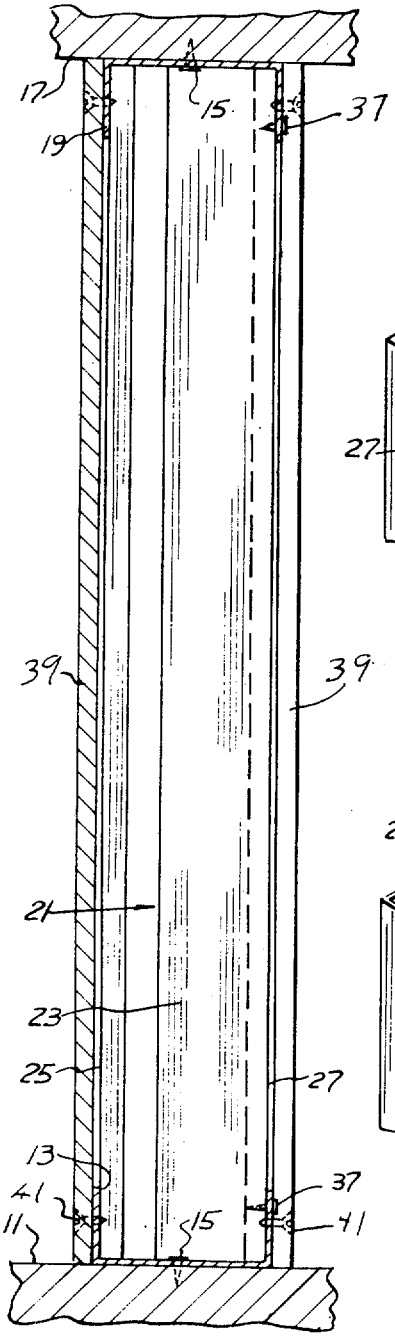
FIG. 3
FIG. 5
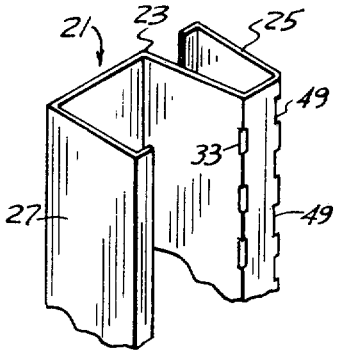
FIG. 6
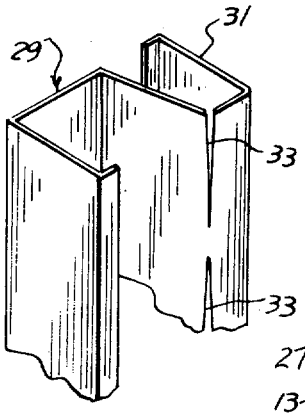
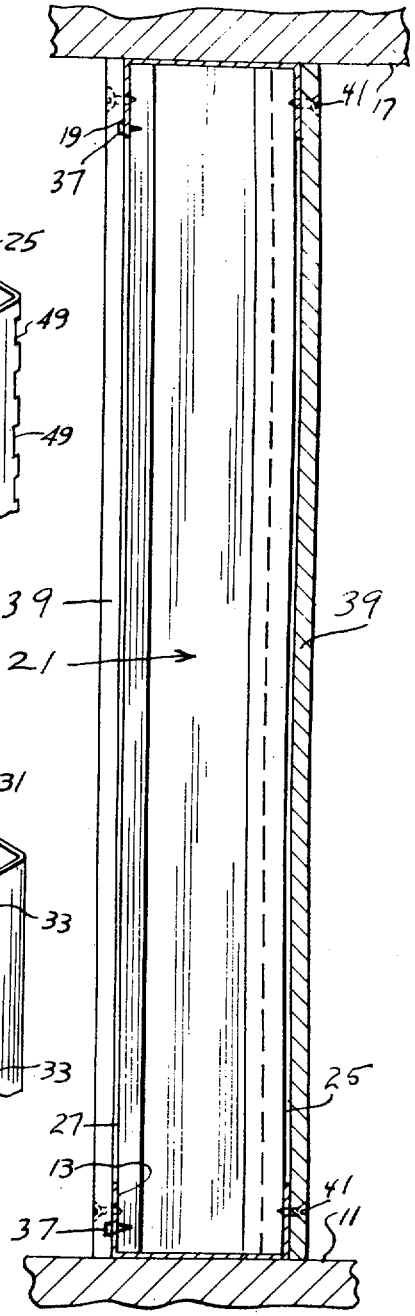
FIG. 4

METHOD OF MAKING WALLS

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation of my copending application Ser. No. 257,943 filed May 30, 1972, now abandoned, which was a division of and copending with application Ser. No. 74,022, filed Sept. 21, 1970, and now abandoned.

SUMMARY OF THE INVENTION

The present invention as specifically described in terms of the preferred embodiments herein shown, relates to a method of constructing a sound attenuating wall between fixed structure, such as floor and ceiling channels. In broad terms, the inventive concept includes first;

providing, arranging, and mounting a line of studs between the fixed structure so that the studs, when formed and mounted, have more resilient flanges and less resilient flanges with the more resilient flanges of any two adjacent studs being alternately and laterally displaced, and second;

providing, arranging, and mounting panels on the studs so that the edges of two adjacent panels on one side are secured to the flange of one stud of that side, with each panel bridging two less resilient flanges of two studs and a more resilient flange of a stud between such two studs.

In the forming and mounting of the studs, the studs may initially have flanges of different resiliency, or only one flange of each stud may be left unanchored to the fixed structure to provide the attenuating limited resiliency, or both. The ultimate result is that the studs, when formed and mounted, each has a more resilient and a less resilient flange, with the more resilient flanges of adjacent studs facing in alternate directions, and equally for the less resilient flanges.

In the mounting of the panels with the edges of two adjacent panels secured to the less resilient flange of the same stud, the center of the panel has a bearing at the more resilient flange of an intervening stud of the side.

It is an object to provide for the proper use of a stud so made as to allow one to build staggered resilience into the wall.

While the method hereof may employ the stud shown and tested, this is only one form of stud. If one took ordinary U-shaped metal studs and adhered ½ inch thick sponge rubber pads to one stud flange, one foot on centers, or provided a sponge rubber strip and erected such a wall as was done, the same test results might be achieved. Such a stud would thus have two sides or flanges of differing resiliency;

the less resilient flange mounts two adjacent panels on one side at their adjacent edges;

the more resilient flanges are adjacent the centers of the same panels;

since the studs are alternately reversed, the same arrangement exists for the opposite side of the wall;

and, thus by definition, a single stud has one side or flange, the less resilient flange, at and fixed to edges of two panels on that one side, and the other side or flange of the same stud, the more resilient flange, is at or adjacent to the center of a panel on the same second side of the wall.

Preferred forms of the invention are here disclosed in the following specification and claims to be read in conjunction with the appended drawings.

THE DRAWINGS

FIG. 1 is a fragmentary perspective view of a portion of the present sound attenuation wall.

FIG. 2 is a fragmentary section taken in the direction of arrows 2—2 of FIG. 1.

FIG. 3 is a fragmentary section taken in the direction of arrows 3—3 of FIG. 1.

FIG. 4 is a fragmentary section taken in the direction of arrows 4—4 of FIG. 4.

FIG. 5 is a fragmentary perspective view of the present improved stud construction.

FIG. 6 is a similar view of a modification.

FIG. 7 is a fragmentary elevational view with the partitions extending longitudinally.

FIG. 8 is similar to FIG. 5 showing a modified stud.

DETAILED DESCRIPTION OF THE EMBODIMENTS SHOWN IN THE DRAWINGS

Referring to the drawings, an improved form of wall is shown adapted for use between fixed structures, such as a building floor 11 and ceiling 17.

A continuous channel means 13, is mounted upon said floor, using spaced fasteners 15. An opposed downwardly extending ceiling channel means 19 overlies said floor channel and is similarly secured to said ceiling by fasteners 15.

While the floor and ceiling channel means have been shown as U-shaped, it is contemplated as an equivalent construction, that the respective channel means could be made up of opposed L-shaped members which when assembled to the respective floor and ceiling would nevertheless provide essentially the opposed U-shaped channels shown in FIG. 3.

STEP ONE

A line or series of longitudinally spaced studs 21 is interposed between and projects into the respective floor and ceiling channels 13 and 19 and is suitably secured with thereto with each stud, as formed and mounted, having a first more resilient side 25 and a second less resilient side 27, and a web 23. Studs 21 are alternately arranged so that the first and second flanges 25–27 of adjacent studs are alternately reversed.

The second less resilient flanges 27 of the studs are anchored to the channels as by fasteners 37. The first or more resilient flanges 25 are not anchored to the channels.

STEP TWO

Wallboard panels generally designated at 39 are applied to opposite sides of the respective studs with the wallboards on each side being in alignment and in engagement with each other at their edges throughout the length of the wall.

The wallboards on each side of the respective studs throughout the length of the partition are in engagement along the registry line 43, FIG. 1 which corresponds to the central portion of the particular second less resilient stud flange to which the wallboards at the respective edges are fixedly secured by fasteners 41.

Each wallboard spans at least three studs with their outer edges fixed to the second less resilient flanges 27 of the outer pair of said three studs as by fasteners 41. In the modification shown in FIG. 7, the wallboards span more than three studs.

The central portion of each wallboard 39 is adjacent a more resilient first stud flange 25. In FIG. 7, central portions of the wallboards loosely bear against adjacent resilient first flanges 25.

It is noted particularly with respect to FIGS. 1 and 2 that the wallboards 39 upon opposite sides of the partition at their respective meeting edges 43 are staggered or offset. Thus the meeting line 43 between a pair of wallboards on one side of the wall is in registry with corresponding central or intermediate portion of an opposed wallboard. The wallboards upon opposite sides of the wall are staggered whereby the wallboard on one side of the wall spans three adjacent studs and the opposing but staggered wallboard on the opposite side of the partition spans two of the said three studs.

By this construction the outer upright edges of each wallboard are fixedly secured to the second flange 27 of the corresponding stud whereas the upright central portion of each wallboard yieldingly bears against the corresponding resilient first flange 25 of the intermediate stud.

Thus, the individual wallboards affixed at their upright edges yieldably bear against the respective central stud and are adapted to flex inwardly and outwardly in the functioning of the present sound attenuation panel. The wallboards along their top and bottom edges are fixedly secured to the floor and ceiling channels by fasteners 41. Likewise in FIG. 7, the longitudinal edge of some wallboards bears against and is affixed to channels 13 and 19.

Suitable sound absorbing pads or blankets 45, of which a pair are shown, FIGS. 1 and 2, are interposed in compression between the assembled opposed wallboards 39 and have a very definite function in the final operation of the present sound attenuating panel. While the present panel as constructed is effective as a sound attenuation panel even without the sound absorbing pads interposed, an improved sound attenuation panel is provided when said pads are provided.

It has been found in operation that any inward flexing of the corresponding wallboards due to the transmission of sound vibrations therethrough causes a frictional rubbing action of the wallboard with respect to the sound absorbing pad. This rubbing action transforms sound energy to heat, thus dissipating the sound and provides an improved sound attenuation wall partition. The compressed pad also dampen vibrations.

Glass fiber strips are shown in the illustrative embodiment, nine feet long for example, and thus extend between the floor and ceiling and are interposed in compression between the wallboards when assembled.

The resilent backing of each wallboard is achieved by the yieldable first flanges 25 providing a yielding relationship between the wallboard at its center and the supporting stud.

REPRISE

As previously indicated the broader aspect of this invention is that the studs, when formed and mounted, have first and second flanges of different resiliency, alternately reversed. One method of accomplishing this result is to anchor only one flange of a stud to the floor and ceiling means. Thus, the stud as mounted, provides the desired result.

Alternately, the stud as formed by prior to mounting may have flanges of different resiliency, in which case mounting only one flange to the floor and ceiling means is optional.

In stud 29, fragmentarily shown in FIG. 6, the resilient first flange 31 is provided additional resiliency by a series of aligned spaced slits 33 formed in the stud web.

FIG. 5 shows the resilient first flange 25 given additional flexibility by the use of more slits. Longitudinally spaced slits 33 correspond to those of FIG. 6. Further longitudinally spaced slits 49 are formed at the one longitudinal edge of flange 25. Slits 49 are alternately arranged and staggered with respect to slits 33.

FIG. 8 is yet another modification of the stud in that the resilient first flange 25' is initially before assembly nonparallel to second flange 27. Flange 25' extends outwardly at an acute angle to flange 27 in the range of 5°–20° for illustration. Upon assembly of the wallboards such as in FIGS. 1 and 2, the resilient first flanges 25' shown in FIG. 8 are then in compression and substantially parallel to plane flanges 25. Resilient first flange 25' has been rendered more flexible and resilient due to the double series of staggered slots 33 and 49.

*MY PRIOR PATENT 3,611,653*

*This co-pending issued patent 3,611,653, hereinafter referred to as the "tabbed stud patent" since it discloses a "tabbed stud" is referenced here so that it may be contrasted, on the record, with the instant patent hereinafter referred to as the "tabless stud patent" since it discloses a "tabless stud".*

*In the "tabbed stud" construction, the two flanges of a stud are anchored and of equal resilience, with one flange, however, having integral struck-out tabs 31. These tabs are intended to provide the bearing surface, which is thus made up of isolated, separated, small projections, bound to be a variety of heights, thus, providing an irregular bearing surface. Since some, at least, of the tabs 31 can and may and probably would become twisted and deformed between the point and time of manufacture and the point and time of use, such tabs could puncture and damage the formed wall surface and panels.*

*The tabless studs hereof will present no such problems, since they are shown in the drawings as free of tabs or protuberances.*

CONCLUSION

The presently preferred embodiments of the invention are shown in the appended drawings and have here been described.

The inventive concepts hereof, however are not limited to such preferred embodiments but are those defined in the claims which follow.

I claim:

1. A method of constructing a sound attenuating wall between parallel fixed structures of a building comprising the steps of:

a. placing a series of double-flange elongated studs in lateral displacement between said structures, with each stud being so mounted and formed as to have a first flange of greater resiliency and a second flange of lesser resiliency, while arranging and mounting the studs in reversed alternation so that the more resilient flanges of spaced adjacent studs face in opposite directions and equally, the less resilient flanges of spaced adjacent studs also face in opposite directions; and the first flanges of one side of the wall are laterally and alternately displaced, and equally, the second flanges of one side of the wall are laterally and alternately displaced;

b. placing wall panels on one side of said series of studs so that the outer edges of adjacent panels are adjacent each other and the less resilient flanges and the central portions of panels on such side are adjacent the more resilient flanges;

c. and finally, affixing the outer edges of the wall panels on such side to the less resilient flanges on such side, with the central intermediate portions of the panels having resilient bearings at the more resilient flanges of such side [.] ,

*d. with each such more resilient flange being substantially smooth and substantially free of external protuberances; so that substantially the entire area of each such more resilient flange provides a resilient overall bearing area for the adjacent central portion of a panel.*

2. A method of constructing a sound attenuating wall between parallel fixed structures of a building comprising the steps of:

a. placing a series of elongated double flange studs in lateral displacement between said structures, with each stud having a first flange unanchored so as to be of greater resiliency and a second flange anchored to such fixed structures to be of lesser resiliency; while anchoring and arranging the studs in reversed alternation so that the unanchored flanges of spaced adjacent studs face in opposite directions and equally; the anchored flanges of spaced adjacent studs also face in opposite directions; and the unanchored flanges of one side of the wall are laterally and alternately displaced, and equally, the anchored flanges of one side of the wall are also laterally and alternately displaced;

b. placing wall panels on one side of said series of studs so that the outer edges of adjacent panels are adjacent each other and the less resilient anchored flanges;

and the unanchored more resilient flanges on such one side are opposite central portions of panels on such side;

c. and finally, affixing the outer edges of the wall panels on such side, to be [unanchored] *anchored* flanges on such side, with the central intermediate portions of the panels having resilient bearings at the unanchored flanges of such side [.] ;

*d. with each such more resilient flange being substantially smooth and substantially free of external protuberances; so that substantially the entire area of each such more resilient flange provides a resilient overall bearing area for the adjacent central portion of a panel.*

3. A method of constructing a sound attenuating wall between parallel fixed structures of a building comprising the steps of:

a. placing a series of elongated double flanged studs in lateral displacement between said structures, with each stud as formed having a first flange of greater resiliency and a second flange of lesser resiliency; while mounting and arranging the studs in reversed alternation so that the more resilient flanges of spaced adjacent studs face in opposite directions and equally, less resilient flanges of spaced adjacent studs also face in opposite directions; and the more resilient flanges of one side of the wall are laterally and alternately displaced, and equally, the less resilient flanges of one side of the wall are laterally and alternately displaced;

b. placing walls panels on one side of said series of studs so that the central portions of such panels are adjacent the more resilient flanges of the studs and the outer edges of adjacent panels on such side are adjacent each other and the less resilient flanges of the studs;

c. and finally, affixing the outer edges of the wall panels on such side to the less resilient flanges on such side, with the central intermediate portions of the panels having resilient bearings at the more resilient first flanges of such side [.] ;

*d. with each such more resilient flange being substantially smooth and substantially free of external protuberances; so that substantially the entire area of each such more resilient flange provides a resilient overall bearing area for the adjacent central portion of a panel.*

4. A method of constructing a sound attenuating wall between parallel fixed structures of a building comprising the steps of:

a. placing a series of elongated double flanged studs in lateral displacement between said structures, with each stud as formed and mounted having a first flange and a second flange; and with the first flanges as formed and mounted having a greater resiliency than the second flanges; while mounting and arranging the studs in reversed alternations so that the more resilient flanges of spaced adjacent studs face in opposite directions and equally, the less resilient flanges of spaced adjacent studs also face in opposite directions; and the more resilient flanges of one side of the wall are laterally and alternately displaced, and equally, the less resilient flanges of one side of the wall are laterally and alternately displaced;

b. placing wall panels on one side, offset with respect to panels on the opposite side so that the central portions of panels on one side are adjacent more resilient flanges of such side and are opposite the outer edges of the opposing panels; and the outer edges of adjacent panels on each side are adjacent each other and are adjacent less resilient flanges of such side; and the edges of panels on one side are opposite central portions of panels on the other side;

c. and finally, affixing the outer edges of the wall panels on each side to the less resilient flanges on such side [.] ;

*d. with each such more resilient flange being substantially smooth and substantially free of external protuberances; so that substantially the entire area of each such more resilient flange provides a resilient overall bearing area for the adjacent central portion of a panel.*

5. The method of constructing a sound attenuation wall between parallel fixed structures of a building which comprises the following steps:

a. providing a series of longitudinally spaced studs between such structures and arranging and anchoring such studs to such structures, whereby, each stud has a more resilient flange; and a less resilient flange anchored to said structure; while arranging the studs so that the less resilient anchored *flanges* and the more resilient flanges are alternately and laterally displaced;

b. arranging and affixing the outer side edges of a series of wallboards to the anchored flanges of alternate studs, with the central portions of the wallboards being adjacent the more resilient flanges of alternate intermediate studs; with the wallboards on one side being staggered with respect to the wallboards on the opposite side, so that the central portions of the wallboards are in registry with the affixed mounted outer edges of the opposing wallboards and, wherein, the central portions of opposing wallboards are staggered with respect to each other [.] ;

c. *with each such more resilient flange being substantially smooth and substantially free of external protuberances; so that substantially the entire area of each such more resilient flange provides a resilient overall bearing area for the adjacent central portion of a panel.*

6. The method of constructing a sound attenuation wall between parallel fixed structures of a building which comprises the following steps:

a. providing, arranging and anchoring a series of longitudinally spaced double flange and web studs between said structures whereby each stud has a more resilient flange which is not anchored and also has a less resilient flange anchored at its ends, and wherein the more resilient unanchored flange is thus more resilient than the anchored flange; including arranging the studs so that adjacent unanchored and anchored flanges are alternated and laterally displaced;

b. arranging and affixing the outer edges of each of a series of wallboards to the anchored flanges of the outer of three adjacent studs wherein, the central portion of each wallboard is adjacent an unanchored resilient flange of an intermediate stud; with the wallboards on one side being staggered with respect to the wallboards on the other side so that the central portion of one wallboard is adjacent an unanchored flange and is in registry with an affixed mounted edge of the opposing wallboard and wherein the central portions of opposing wallboards are staggered with respect to each other and wherein the affixed edge portions of opposing wallboards are staggered with respect to each other [.] ;

c. *with each such more resilient flange being substantially smooth and substantially free of external protuberances; so that substantially the entire area of each such more resilient flange provides a resilient overall bearing area for the adjacent central portion of a panel.*

7. A method for constructing a sound attenuation wall between parallel fixed structures of a building having anchor means arranged for anchoring the ends of a series of studs longitudinally spaced along such anchor means, comprising the following steps:

a. providing a series of studs, each having a web and two flanges, at least one of which is normally of a substantial degree of resilience; and anchoring the series of studs in longitudinally spaced relation to said anchor means, with the resilient flanges alternated on opposite sides of such anchor means; by affixing the ends of anchored flanges of alternate studs to said anchor means and leaving unaffixed the ends of the resilient flanges of the studs, whereby the anchored flanges become of even lesser resilience than when unanchored, and whereby the unanchored flanges remain of their previous condition of resilience; thus insuring a difference in resiliency of anchored and unanchored flanges;

b. arranging and affixing edges of each of a series of large wallboards to the anchored flanges of the outer of three adjacent studs with the central portion of each wallboard being adjacent the unanchored flanges;

whereby the wallboards on one side are staggered with respect to the wallboards of the opposite side, so that the central portion of one wallboard is in registry with the affixed mounted edges of the opposing wallboards, and the affixed portions of adjacent wallboards are in registry with the central portion of an opposing wallboard [.] ;

c. *with each such more resilient flange being substantially smooth and substantially free of external protuberances; so that substantially the entire area of each such more resilient flange provides a resilient overall bearing area for the adjacent central portion of a panel.*

8. The method of constructing a sound attenuation wall between parallel fixed structures of a building which comprises the following steps:

a. providing, arranging and mounting a series of longitudinally spaced double flange and web studs between such structures wherein each formed and mounted stud has its first flange more resilient than its second flange; while arranging the studs so that adjacent more resilient and less resilient flanges are alternated and laterally displaced;

b. arranging and affixing the outer edges of each of a series of wallboards to the less resilient flanges of the outer of three adjacent studs whereby the central portion of each wallboard is adjacent a more resilient flange of an intermediate stud [.] ;

c. *with each such more resilient flange being substantially smooth and substantially free of external protuberances; so that substantially the entire area of each such more resilient flange provides a resilient overall bearing area for the adjacent central portion of a panel.*

9. A method for constructing a sound attenuation wall between parallel fixed structures of a building having means for anchoring the ends of a series of studs longitudinally spaced along such anchoring means, comprising the following steps:

a. arranging and providing a series of studs, each having a web and two flanges, and mounting the series of studs in longitudinally spaced relation to said anchoring means, with the studs being so formed and mounted that one flange of each stud is considerably more resilient than a second flange of each stud with the more resilient flanges alternated on opposite sides of such anchoring means;

b. providing, arranging and affixing the outer edges of each of a series of large wallboards to the less resilient flanges of the outer pair of three adjacent studs with the inner intermediate portion of each wallboard being against the more resilient flanges of an intermediate stud [.] ;

*c. with each such more resilient flange being substantially smooth and substantially free of external protuberances; so that substantially the entire area of each such more resilient flange provides a resilient overall bearing area for the adjacent central portion of a panel.*

10. A method for constructing a sound attenuation wall between parallel fixed structures of a building having means for anchoring the ends of a series of studs longitudinally spaced along such anchoring means, comprising the following steps:

a. providing and arranging a series of studs, each having a web and two flanges; and mounting the series of studs in longitudinally spaced relation to said anchoring means and anchoring the studs to said anchoring means; with the more resilient flanges alternated on opposite sides of such anchoring means;

b. arranging and affixing the outer edges of each of a series of large wallboards to the less resilient flanges of the outer pair of three adjacent studs with the central portion of each wallboard being against a more resilient flange of an intermediate stud;

whereby the wallboards on one side of the wall are staggered with respect to the wallboards of the opposite side, so that the central portion of one wallboard, adjacent a more resilient flange, is in registry with the affixed mounted edges of the opposing wallboards, bearing against a less resilient flange, and the affixed portions of adjacent wallboards, bearing against a less resilient flange, are in registry with the central portion of an opposing wallboard, adjacent a more resilient flange;

thereby providing a staggered resilient mounting of wallboards and alongside opposite sides of said studs [.] ;

*c. with each such more resilient flange being substantially smooth and substantially free of external protuberances; so that substantially the entire area of each such more resilient flange provides a resilient overall bearing area for the adjacent central portion of a panel.*

* * * * *